US011546247B2

(12) United States Patent
Mohanty et al.

(10) Patent No.: US 11,546,247 B2
(45) Date of Patent: Jan. 3, 2023

(54) FAST CONVERGENCE IN ACCESS NETWORKS

(71) Applicant: Cisco Technology Inc., San Jose, CA (US)

(72) Inventors: Satya Ranjan Mohanty, San Ramon, CA (US); Soumya Roy, Fremont, CA (US); Yuri Tsier, Kanata (CA); Apoorva Karan, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 171 days.

(21) Appl. No.: 17/153,983

(22) Filed: Jan. 21, 2021

(65) Prior Publication Data

US 2022/0231936 A1   Jul. 21, 2022

(51) Int. Cl.
| | |
|---|---|
| *H04L 12/715* | (2013.01) |
| *H04L 12/775* | (2013.01) |
| *H04L 12/723* | (2013.01) |
| *H04L 12/733* | (2013.01) |
| *H04L 12/707* | (2013.01) |
| *H04L 12/46* | (2006.01) |
| *H04L 45/02* | (2022.01) |
| *H04L 45/58* | (2022.01) |
| *H04L 45/00* | (2022.01) |

(Continued)

(52) U.S. Cl.
CPC .......... *H04L 45/04* (2013.01); *H04L 12/4675* (2013.01); *H04L 45/20* (2013.01); *H04L 45/24* (2013.01); *H04L 45/50* (2013.01); *H04L 45/58* (2013.01)

(58) Field of Classification Search
CPC ..... H04L 45/04; H04L 12/4675; H04L 45/20; H04L 45/24; H04L 45/50; H04L 45/58
See application file for complete search history.

(56) References Cited

U.S. PATENT DOCUMENTS

| | | | |
|---|---|---|---|
| 7,869,345 B2 * | 1/2011 | Scudder | ................. H04L 45/50 370/242 |
| 9,660,897 B1 | 5/2017 | Gredler | |

(Continued)

OTHER PUBLICATIONS

"IP Routing: BGP Configuration Guide, Cisco IOX XE Release 3S," Chapter 43, BGP PIC Edge for IP and MPLS-VPN, Cisco Systems, Inc., Aug. 12, 2013. 68 pages.

(Continued)

*Primary Examiner* — Luat Phung
(74) *Attorney, Agent, or Firm* — Baker Botts, LLP

(57) ABSTRACT

In some embodiments, a first provider edge (PE) router is coupled to a first customer edge (CE) router; a second CE router; and a second PE router. The second PE router is coupled to the first CE router and the second CE router. The first PE router is configured with a primary label comprising a primary next hop of the first CE router and a backup next hop of the second PE router and a secondary label comprising a primary next hop of the first CE router and a backup next hop of the second CE router. The second PE router is configured with a primary label comprising a primary next hop of the first CE router and a backup next hop of the first PE router and a secondary label comprising a primary next hop of the first CE router and a backup next hop of the second CE router.

20 Claims, 5 Drawing Sheets

(51) Int. Cl.
    *H04L 45/24*         (2022.01)
    *H04L 45/50*         (2022.01)

(56) References Cited

U.S. PATENT DOCUMENTS

| | | | |
|---|---|---|---|
| 2006/0209682 A1* | 9/2006 | Filsfils | H04L 45/502 |
| | | | 370/219 |
| 2007/0121486 A1* | 5/2007 | Guichard | H04L 45/28 |
| | | | 370/216 |
| 2009/0010182 A1* | 1/2009 | Tochio | H04L 45/00 |
| | | | 370/254 |
| 2014/0286155 A1 | 9/2014 | Bashandy | |
| 2015/0009806 A1 | 1/2015 | Bashandy et al. | |
| 2019/0222431 A1* | 7/2019 | Gao | H04L 45/18 |
| 2022/0231906 A1* | 7/2022 | He | H04L 12/462 |

OTHER PUBLICATIONS

A. Bashandy, C. Filsfils, and P. Mohapatra, BGP Prefix Independent Convergence draft-ietf-rtgwg-bgp-pic-12.txt, Network Working Group Internet Draft, Aug. 11, 2020, 30 pages.
Ala Abdelali, Driss El Ouadghiri, and Mohamed Essaaidi, Using LDP Fastreroute Versus LDPORSVP in an MPLS Core Backbone for Convergence Enhancement, Journal of Theoretical and Applied Information Technology, Jan. 31, 2013, vol. 47, No. 3, 9 pages.

\* cited by examiner

FAST CONVERGENCE IN ACCESS NETWORKS

TECHNICAL FIELD

Particular embodiments described herein generally relate to routing, and more specifically to fast convergence in access networks.

BACKGROUND

Border Gateway Protocol (BGP) is an exterior gateway protocol that exchanges routing and reachability information among autonomous systems (AS). BGP used for routing within an AS may be referred to as Interior BGP (IBGP), and BGP used for routing between AS may be referred to as Exterior BGP (EBGP).

To improve BGP convergence time, some networks may configure prefix independent convergence (PIC). There are two types of PIC. BGP PIC Core improves convergence time when a core router fails and the internal gateway protocol needs to find a new best path to the provider edge (PE) router. BGP PIC Edge improves convergence time when a PE router fails and BGP needs to switch to a different PE router.

Under normal circumstances, BGP can take several seconds to a few minutes to converge after a network change. At a high level, BGP goes through the following process. BGP learns of failures through either interior gateway protocol or bidirectional forwarding detection (BFD) events or interface events. BGP withdraws the routes from the routing information base (RIB), and the RIB withdraws the routes from the forwarding information base (FIB) and distributed FIB (dFIB). This process clears the data path for the affected prefixes.

BGP sends withdraw messages to its neighbors and calculates the next best path to the affected prefixes. BGP inserts the next best path for affected prefixes into the RIB, and the RIB installs them in the FIB and dFIB.

This process takes a few seconds or a few minutes to complete, depending on the latency of the network, the convergence time across the network, and the local load on the devices. The data plane converges only after the control plane converges.

BGP PIC adds functionality in the BGP, RIB, Cisco Express Forwarding, and multi-protocol label switching (MPLS). With respect to BGP functionality, for Internet Protocol (IP) prefixes BGP PIC calculates an additional second best path along with the primary best path. The second best path is referred to as the backup/alternate path. BGP installs the best and backup/alternate paths for the affected prefixes into the BGP RIB. The backup/alternate path provides a fast reroute mechanism to counter a singular network failure. BGP also includes the alternate/backup path in its application programming interface (API) to the IP RIB.

With respect to BGP PIC RIB functionality, the RIB installs an alternate path per route if one is available. With the BGP PIC functionality, if the RIB selects a BGP route containing a backup/alternate path, it installs the backup/alternate path with the best path. The RIB also includes the alternate path in its API with the FIB.

With respect to BGP PIC and Cisco Express Forwarding functionality, Cisco Express Forwarding stores an alternate path per prefix. When the primary path goes down, Cisco Express Forwarding searches for the backup/alternate path in a prefix independent manner. Cisco Express Forwarding also listens to BFD events to rapidly detect local failures.

With respect to BGP PIC and MPLS functionality, MPLS forwarding is similar to Cisco Express Forwarding, in that it stores alternate paths and switches to an alternate path if the primary path goes down.

When the BGP PIC feature is enabled, BGP calculates a backup/alternate path per prefix and installs it into BGP RIB, IP RIB, and FIB. This improves convergence after a network failure.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

The Border Gateway Protocol (BGP) prefix independent convergence (PIC) Edge feature for Internet Protocol (IP) and multi-protocol label switching virtual private network (MPLS-VPN) feature improves BGP convergence after a network failure. The convergence is applicable to both core and edge failures and can be used in both IP and MPLS networks.

Specifically, the BGP PIC Edge for IP and MPLS-VPN feature creates and stores a backup/alternate path in the routing information base (RIB), forwarding information base (FIB), and Cisco Express Forwarding so that when an access-link failure is detected, the backup/alternate path can immediately take over, thus enabling fast failover. BGP best-external is another feature based on PIC Edge that guarantees that packet forwarding remains intact to the destination when the primary fails by immediately activating the backup path in the FIB when the primary path fails.

There exist, however, many brown-field network deployments where the traditional BGP PIC solution is inadequate for double link failures. With proliferation of dual connections to the customer premise and an assured availability metric of five nines (99.999% service level agreement (SLA)) by customers becoming the norm, a double link failure can no longer be glossed over, and should not result in a traffic convergence or black-holing problem.

Customers are requesting fast sub-second convergence for a double link failure. Existing BGP PIC Edge techniques in the dual connection topology are not useful. An example is illustrated in FIGS. 1 and 2.

Figure 1:
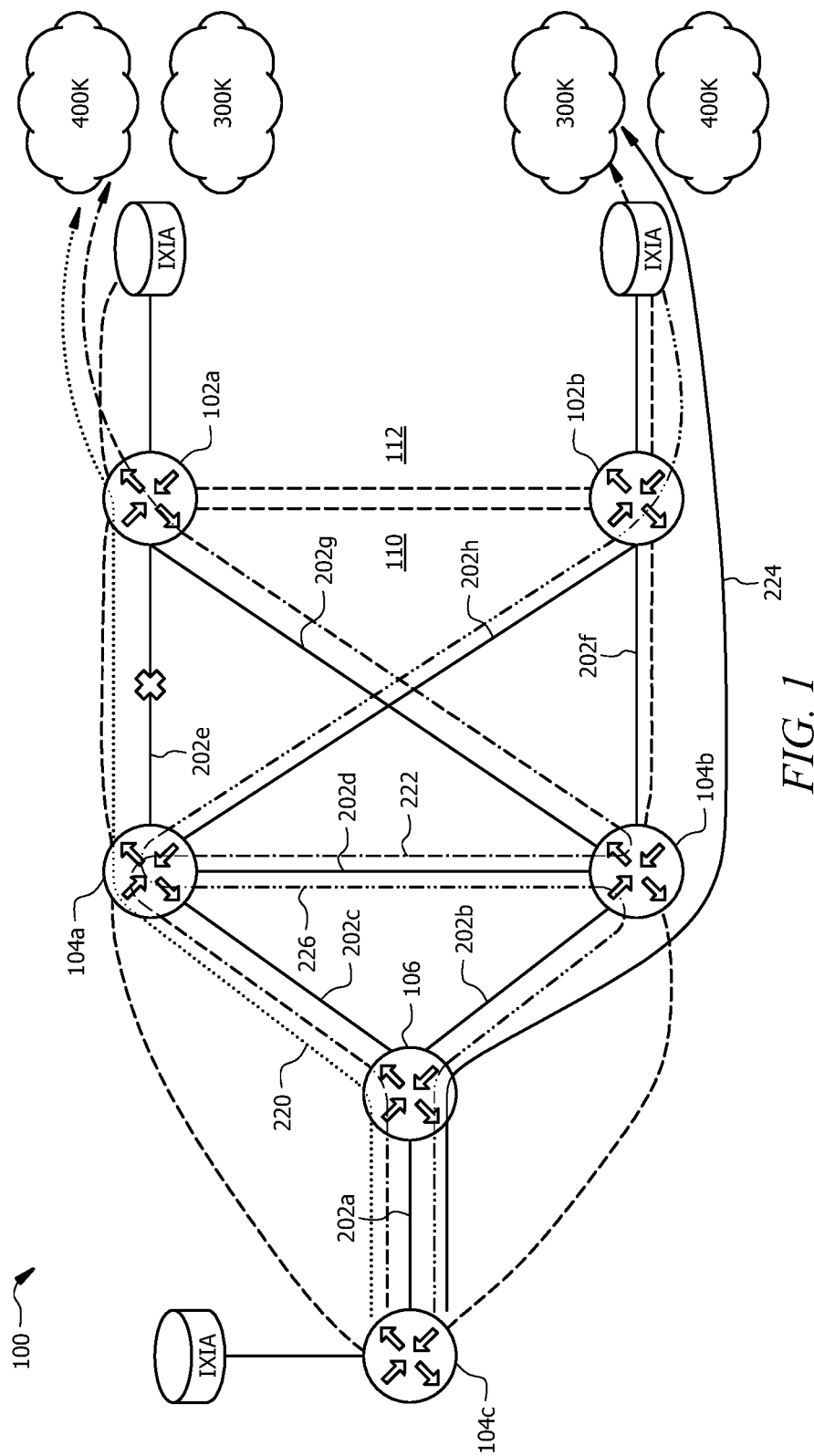
FIG. 1 is a network diagram illustrating a single link failure.
Figure 2:
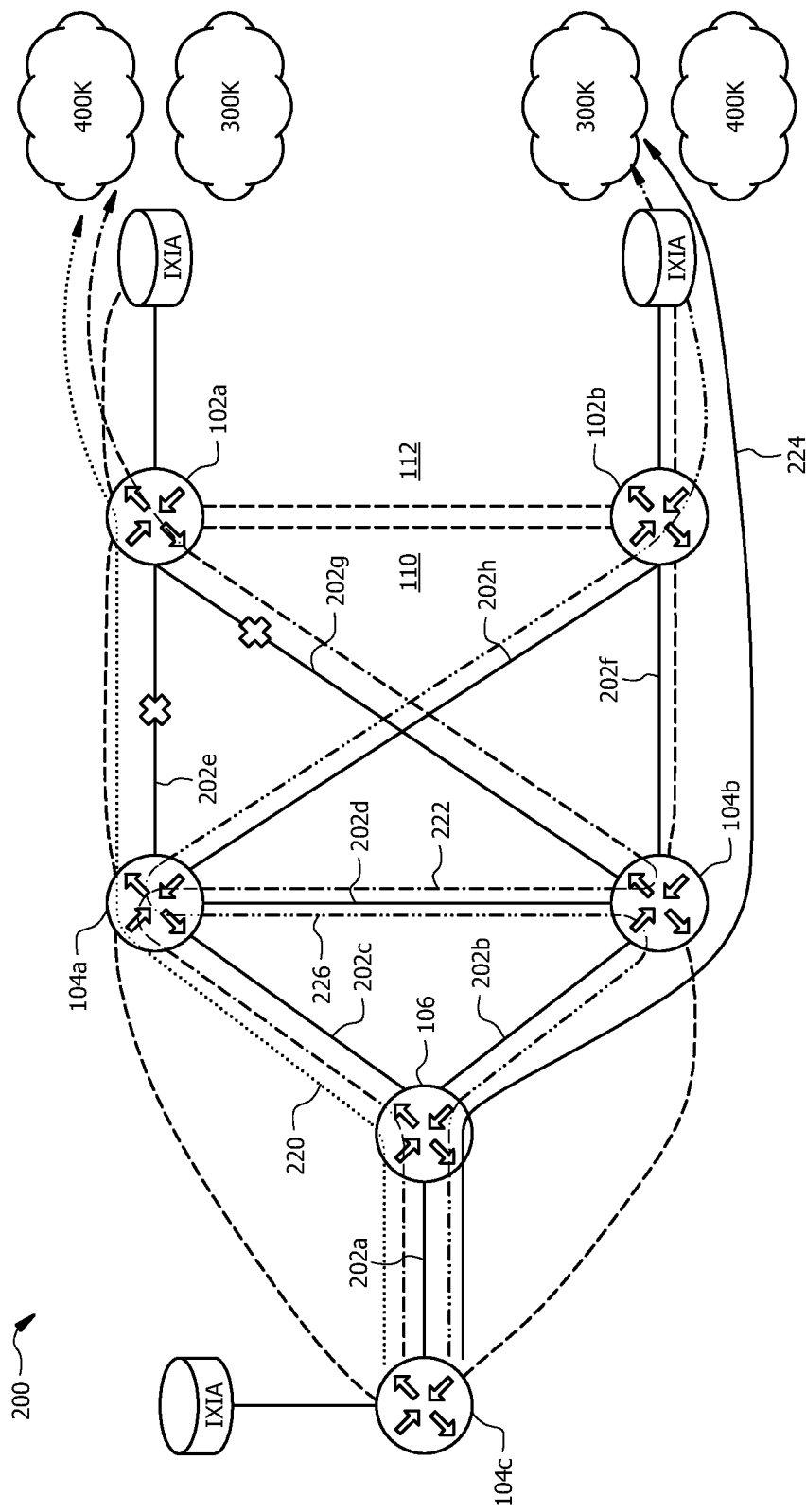
FIG. 2 is a network diagram illustrating a double link failure.

FIG. 1 is a network diagram illustrating a single link failure. Network 100 includes autonomous system (AS) 110 and AS 112. AS 112 includes two customer edge (CE) routers 102a and 102b. AS 110 includes provider edge (PE) routers 104a, 104b, and 104c, and provider core (P) router 106. CE routers 102, PE routers 104, and P router 106 are interconnected via links 202, as illustrated.

CE routers 102a and 102b establish external BGP (EBGP) sessions with PE routers 104a and 104b, respectively. Both CE routers 102a and 102b advertise the same 700 K prefixes/routes to PE routers 104a and 104b. Both PE routers 104a and 104b only send the default route to remote PE router 104c. For example, the 400 K prefixes/route follow default path 220, and the 300 K prefixes/route follow default path 224.

PE routers 104a, 104b, and 104c use VPNv4 peering. Traffic from remote PE router 104c does equal-cost multiple-path (ECMP) forwarding to both PE routers 104a and 104b.

The 400 K routes prefer CE router 102a as the egress next hop and 300 K routes prefer CE router 102b as the egress next hop by policies configured on PE routers 104a and 104b. The policy is a BGP policy that associates the highest local preference (LP) with the preferred EBGP path, the next highest local preference with the IBGP path, and the lowest local preference with the least preferred EBGP path.

In a single failure scenario, if link 202e between PE router 104a and CE router 102a goes down, for example, after BGP at PE router 104a converges, traffic will traverse link 202d between PE router 104a and PE router 104b and then reach CE router 102a through link 202g between PE router 104b and CE router 102a. The convergence time may be on the order of 70 to 90 seconds, for example.

FIG. 2 is a network diagram illustrating a double link failure. Network 100 illustrated in FIG. 2 is the same network topology and configuration illustrated in FIG. 1.

In a double failure scenario, if link 202g between PE router 104b and CE router 102a goes down, for example, traffic will traverse link 202h to CE router 102b after BGP convergence at PE routers 104a and 104b. The convergence time may be on the order of 80 to 100 seconds, for example.

To improve convergence time, a network operator may configure BGP Edge PIC. For example, the network operator may configure backup path 222 for the 400 K prefixes/routes and backup path 226 for the 300 K prefixes/routes.

In the single failure scenario illustrated in FIG. 1, configuring BGP PIC may reduce convergence time to under 10 seconds, for example. For the double failure scenario illustrated in FIG. 2, however, BGP PIC may actually adversely affect convergence times, resulting in convergence times on the order of 200 seconds, for example.

The reason is that when link 202e between PE router 104a and CE router 102a goes down, the traffic that ingresses on PE router 104a gets diverted to PE router 104b. Because link 202g between PE router 104b and CE router 102a is also down and the BGP withdraw from PE router 104a has not yet been received at PE router 104b, the diverted traffic suffers a routing lookup at PE router 104b and will be sent back to PE router 104a.

At PE router 104a the traffic suffers a routing lookup and is again diverted to PE router 104b. The circular process repeats until the BGP withdraws corresponding to the failed links are received at the peer PE routers. The particular label allocation mode has no bearing on the loop, the loop will happen regardless.

FIB performance is adversely impacted because of the loop and new control plane state after convergence takes more time to be installed in the FIB. Thus, BGP PIC by itself is inadequate for the above described convergence problems arising from double link failures.

Example Embodiments

Particular embodiments obviate one or more of the problems described above. A main cause of the problems with BGP PIC with dual failures described above is that the status of the link between the provider edge router and the customer edge router is not known to the peer provider edge router until it receives the corresponding BGP withdraw. Particular embodiments include BGP augmentations to improve convergence time for double failures.

According to some embodiments, A network system comprises a first PE router and a second PE router. The first PE router comprises: a first interface communicably coupled to a first customer edge (CE) router via a first link; a second interface communicably coupled to a second CE router via a second link; and a third interface communicably coupled to the second PE router via a third link. The second PE router comprises: a first interface communicably coupled to the first CE via a fourth link; a second interface communicably coupled to the second CE router via a fifth link; and a third interface communicably coupled to the first PE router via the third link.

The first PE router is configured with a primary label comprising a primary next hop of the first CE router and a backup next hop of the second PE router and a secondary label comprising a primary next hop of the first CE router and a backup next hop of the second CE router. The second PE router is configured with a primary label comprising a primary next hop of the first CE router and a backup next hop of the first PE router and a secondary label comprising a primary next hop of the first CE router and a backup next hop of the second CE router.

When the first link and the fourth link are up, ingress traffic at the first PE router with the primary label is forwarded to the first CE router over the first link. When the first link is down and the fourth link is up, ingress traffic at the first PE router with the primary label is label switched to the secondary label of the second PE router and is forwarded to the first CE router via the third link to the second PE router and the fourth link to the first CE router. When the first link is down and the fourth link is down, ingress traffic at the first PE router with the primary label is label switched to the secondary label of the second PE router and is forwarded to the second CE router via the third link to the second PE router and the fifth link to the second CE router.

According to some embodiments, EBGP is running between the first and second PE routers and the first and second CE routers. IBGP is running between the first and second PE routers. An interior gateway protocol (e.g., OSPF, ISIS) is running between the first and second PE routers and a loopback on each of the first and second CE routers.

The first PE router is configured with a primary label comprising a primary next hop of the first CE router, a first backup next hop of the second PE router, and a second backup next hop of the second CE router. The second PE router is configured with a primary label comprising a primary next hop of the first CE router, a first backup next hop of the first PE router, and a second backup next hop of the first CE router.

When the first link and the fourth link are up, ingress traffic at the first PE router with the primary label is forwarded to the first CE router over the first link. When the first link is down and the loopback of the first CE router is up according to the interior gateway protocol, ingress traffic at the first PE router with the primary label is sent via the first backup next hop to the second PE router and is forwarded to the first CE router via the third link to the second PE router and the fourth link to the first CE router. When the first link is down and the loopback of the first CE router is down according to the interior gateway protocol, ingress traffic at the first PE router with the primary label is sent via the second backup next hop to the second PE router and is forwarded to the second CE router via the third link to the second PE router and the fifth link to the second CE router.

Particular embodiments may include one or more of the following advantages. For example, particular embodiments facilitate fast convergence with PIC Edge-like guarantees even for a double link failure. Particular embodiments may be implemented in the FIB and may leverage existing control plane devices.

Figure 3:
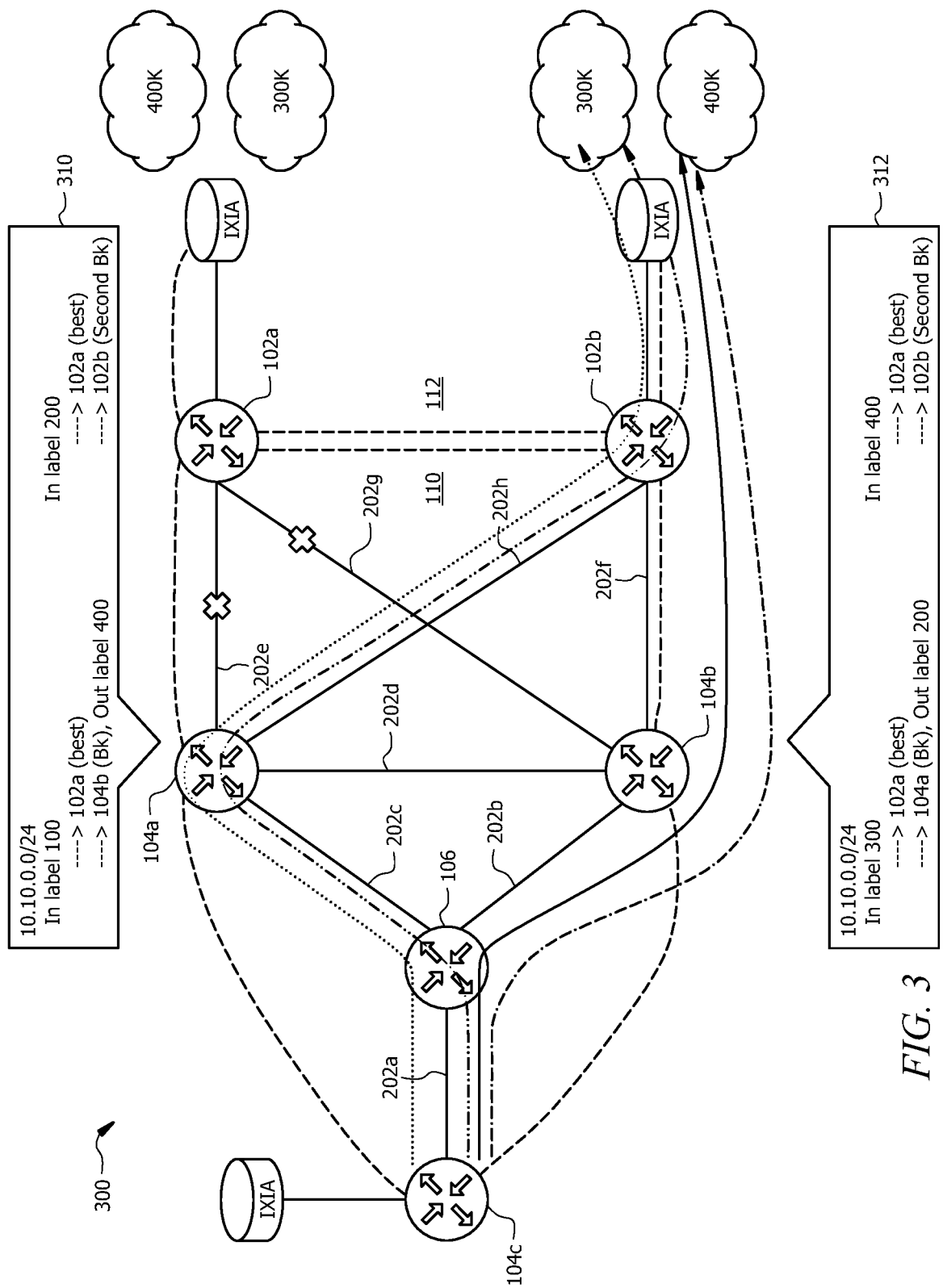
FIG. 3 is a network diagram illustrating a double link failure and a second PIC label, according to some embodiments.
Figure 4:
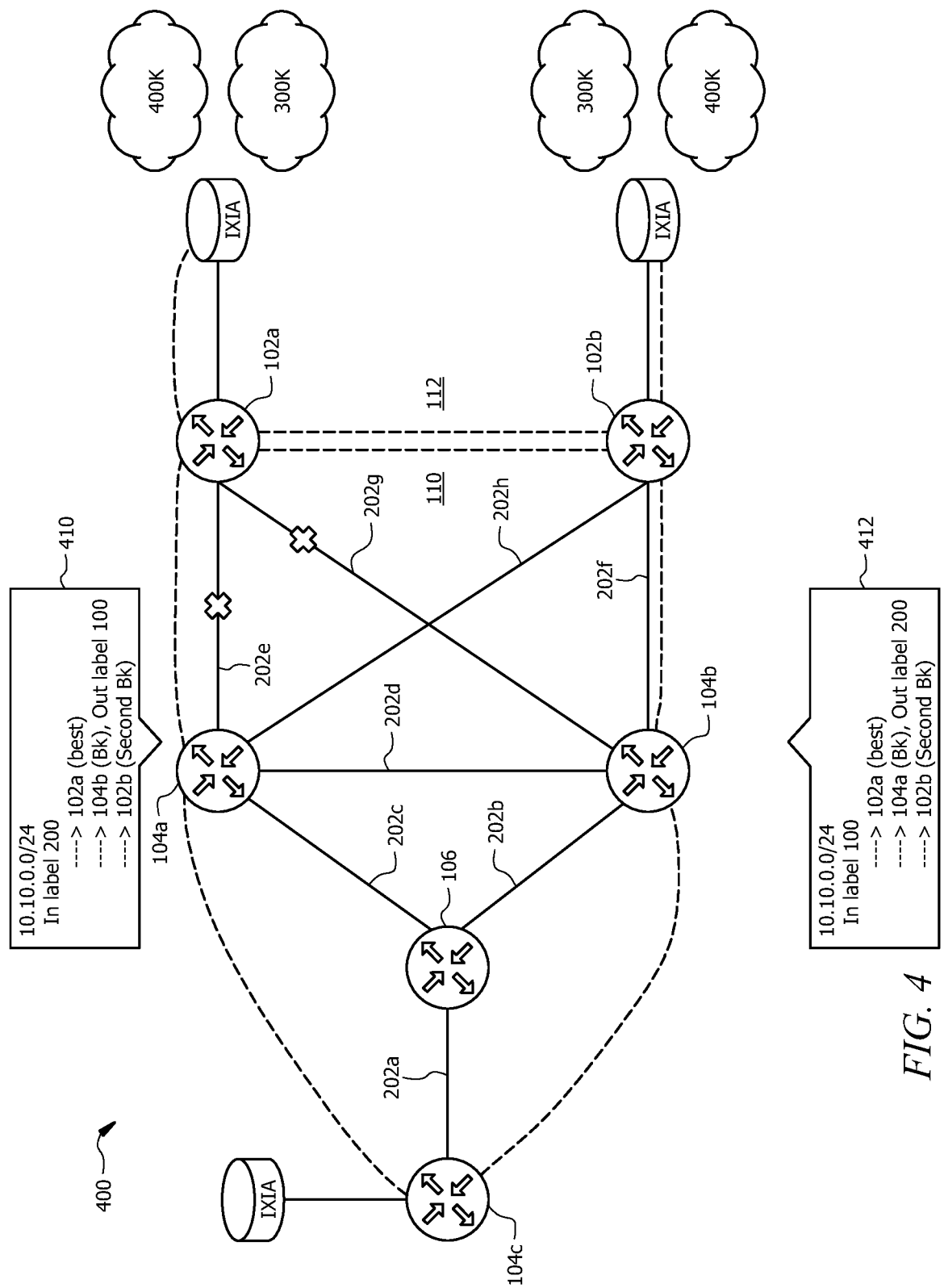
FIG. 4 is a network diagram illustrating a double link failure and an interior gateway protocol used in conjunction with BGP PIC, according to some embodiments.
Figure 5:
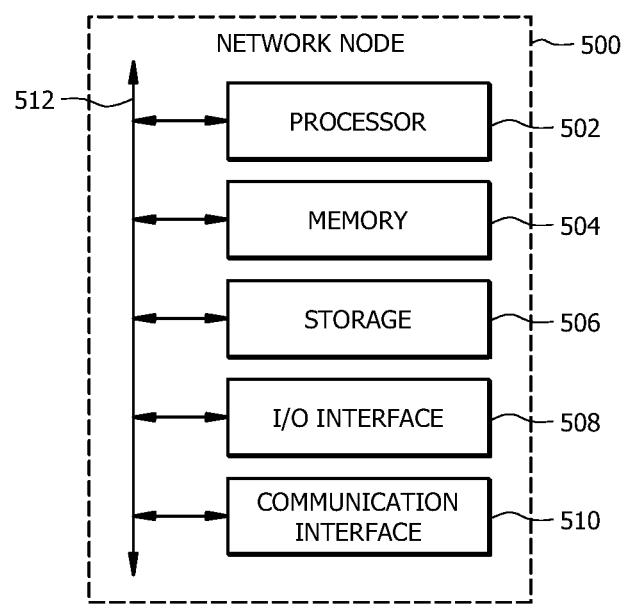
FIG. 5 is a block diagram illustrating an example network node, according to particular embodiments.

Embodiments of the present disclosure and their advantages are best understood by referring to FIGS. 3 through 5 of the drawings, like numerals being used for corresponding parts of the various drawings. Although certain embodiments may be described in reference to particular illustrated examples, the disclosure herein is not limited to the particular illustrated embodiments and/or configurations and includes any and all variants of the illustrated embodiments and any and all systems, methods, or apparatuses consistent with the teachings of this disclosure, as understood by a person having ordinary skill in the art.

FIG. 3 is a network diagram illustrating a double link failure and a second PIC label, according to some embodiments. The components of SD-WAN 100 illustrated in FIG. 3 are similar to those described above with respect to FIGS. 1 and 2.

In some embodiments, BGP PIC is augmented with a second label so that the peer provider edge routers do not have to wait on BGP withdraw upon a double link failure. For example, in some embodiments the primary label includes a primary path pointing to the directly connected preferred CE router (e.g., best EBGP path). The primary label includes a backup path pointing to the less preferred PE router (e.g., IBGP path).

The secondary label includes a primary path pointing to the directly connected preferred CE router (e.g., best EBGP path). The secondary label includes a backup path pointing to the less preferred EBGP path.

The secondary label may be advertised in the control plane along with the primary label. The secondary label also includes a primary and backup path. Operation of the secondary label is described below with respect to the traffic for the 400 K prefixes/routes with respect to CE router 102a. The operation for the other 300 K prefixes/routes follows a symmetric operation with respect to CE router 102b.

For example, PE router 104a may be configured with configuration 310. Configuration 310 includes a primary label 100 and a secondary label 200.

Primary label 100 includes a primary path pointing to the primary next hop CE router 102a. Primary label 100 includes a backup path pointing to the backup next hop PE router 104b and an outgoing label of 400.

Secondary label 200 includes a primary path pointing the primary next hop CE router 102a. Secondary label 200 includes a backup path pointing to the backup next hop CE router 102b.

PE router 104b may be configured with configuration 312. Configuration 312 includes a primary label 300 and a secondary label 400.

Primary label 300 includes a primary path pointing to the primary next hop CE router 102a. Primary label 300 includes a backup path pointing to the backup next hop PE router 104a and an outgoing label of 200.

Secondary label 400 includes a primary path pointing the primary next hop CE router 102a. Secondary label 400 includes a backup path pointing to the backup next hop CE router 102b.

Traffic from the remote PE router 104c uses primary label 100. Traffic sent from one peer PE router 104 (e.g., PE router 104a) to another peer PE router (e.g., PE router 104b) is sent using the backup label (e.g., label 200 (from PE router 104b to 104a) or 400 (from PE router 104a to 104b).

Prefix 10.10.1.0/24 is one example VPN prefix in the group of 400 K. Traffic to 10.10.1.0/24 from PE router 104c is received at PE router 104a with label 100. In the normal case, the traffic is sent on direct link 202e to CE router 102a. If link 202e goes down, the traffic is diverted to PE router 104b with label 400 (based on the backup path associated with the primary label configured at PE router 104a).

When the traffic is received at PE router 104b, if link 202g to CE router 102a is up, traffic is forwarded to CE router 102a on link 202g. If link 202g to CE router 102a, however, goes down, the backup path for label 400 is activated immediately. The backup path points to the next hop CE router 102b and traffic is directed to CE router 102b over link 202f.

Accordingly, PE routers 102a and 102b are not dependent on receiving a BGP withdraw for its peer, and convergence times are significantly improved. Although a particular network configuration is illustrated, particular embodiments are suited for any network configuration with dual connectivity to the customer edge.

Other embodiments may include other mechanisms to alert peer PE routers about a dual link failure. One example includes using an interior gateway protocol for such notifications. An example is illustrated in FIG. 4.

FIG. 4 is a network diagram illustrating a double link failure and an interior gateway protocol used in conjunction with BGP, according to some embodiments. The components of SD-WAN 100 illustrated in FIG. 4 are similar to those described above with respect to FIGS. 1 and 2.

In some embodiments, BGP is used in conjunction with an interior gateway protocol so that the peer provider edge routers do not have to wait on BGP withdraw upon a double link failure. For example, some embodiments may run intermediate system to intermediate system (ISIS) or open shortest path first (OSPF) on the access interfaces in the peer PE routers to the interfaces of the CE routers.

In the illustrated example, an interior gateway protocol, such as ISIS or OSPF, may be configured between PE routers 104a and 104b and CE routers 102a and 102b. In some embodiments, a loopback interface is reserved on CE routers 102a and 102b and advertised in the interior gateway protocol.

PE routers 104a and 104b may be configured with L3VPN labels. The label has the primary path towards the preferred CE router, first backup towards the peer PE router, and second backup towards the less preferred EBGP path.

For example, PE router 104a includes configuration 410. Configuration 410 includes incoming label 200 associated with a primary path towards CE router 102a, first backup towards 104b with outgoing label 100, and a second backup towards CE router 102b.

PE router 104b includes configuration 412. Configuration 412 includes incoming label 100 associated with a primary path towards CE router 102a, first backup towards 104b with outgoing label 200, and a second backup towards CE router 102b.

In operation, core traffic ingresses PE router 104b with label 100. When link 202g to CE router 102a is down, if the loopback interface to CE router 102a is reachable in the interior gateway protocol, PE router 104b chooses first backup path with next hop to PE router 104a. Traffic is diverted to PE router 104a over link 202d with swapped label 200. If the loop interface to CE router 102*a* is not reachable, the second backup path corresponding to a next hop to CE router 102*b* is activated and traffic is sent on link 202*f* to CE router 102*b*.

Accordingly, PE routers 102*a* and 102*b* are not dependent on receiving a BGP withdraw for its peer, and convergence times are significantly improved. Although a particular network configuration is illustrated, particular embodiments are suited for any network configuration with dual connectivity to the customer edge.

Some embodiments may include bidirectional forwarding detection (BFD). For example, some embodiments may run a single BFD session (part MPLS and part IP) between each of the access PEs and the CE. The BFD session goes over the MPLS core and the PE-CE unlabeled link. For example, with respect to the previous figures, the BFD session may be between PE router 104*a* and PE router 104*b* via the PE router 104*a*-PE router 104*b*-CE router 102*a* links. The remote BFD end-point, PE router 104*b* can therefor do a fast sub-second detection of the PE router 104*a*-CE router 102*a* link status by checking for CE router 102*a* connectivity.

Normally the primary path has the IBGP path as the backup. However, once the remote-link failure status is communicated via the BFD, the back-up path preference order is now reversed, i.e. the other EBGP path becomes the preferred backup. This can be done in the forwarding by installing the IBGP learned path and the less-preferred EBGP path as the backups in that preferred order and inverting the order when necessary.

FIG. 5 is a block diagram illustrating an example network node, according to particular embodiments. A network node may comprise a CE router, a PE router, and/or a P router (such as CE router 102, PE router 104, and/or P router 106 described with respect to FIGS. 3 and 4).

In particular embodiments, one or more network nodes 500 perform one or more steps of one or more methods described or illustrated herein. In particular embodiments, one or more network nodes 500 provide functionality described or illustrated herein, such as the functionality described with respect to FIGS. 3 and 4. In particular embodiments, software running on one or more network nodes 500 performs one or more steps of one or more methods described or illustrated herein or provides functionality described or illustrated herein. Particular embodiments include one or more portions of one or more network nodes 500. Herein, reference to a network node may encompass a computing device, and vice versa, where appropriate. Moreover, reference to a network node may encompass one or more network nodes, where appropriate.

Particular embodiments may include any suitable number of network nodes 500. Network node 500 may take any suitable physical form. As example and not by way of limitation, network node 500 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a server, or a combination of two or more of these. Where appropriate, network node 500 may include one or more network nodes 500; be unitary or distributed; span multiple locations; span multiple machines; span multiple data centers; or reside in a cloud, which may include one or more cloud components in one or more networks.

Where appropriate, one or more network nodes 500 may perform without substantial spatial or temporal limitation one or more steps of one or more methods described or illustrated herein. As an example and not by way of limitation, one or more network nodes 500 may perform in real time or in batch mode one or more steps of one or more methods described or illustrated herein. One or more network nodes 500 may perform at different times or at different locations one or more steps of one or more methods described or illustrated herein, where appropriate.

In particular embodiments, network node 500 includes a processor 502, memory 504, storage 506, an input/output (I/O) interface 508, a communication interface 510, and a bus 512. Although this disclosure describes and illustrates a particular network node having a particular number of particular components in a particular arrangement, particular embodiments may include any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. Processor 502 may include any suitable number of any suitable internal caches, where appropriate.

As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502.

In particular embodiments, processor 502 may include one or more internal registers for data, instructions, or addresses. Processor 502 may include any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, particular embodiments may include any suitable processor.

In particular embodiments, memory 504 includes main memory for storing instructions for processor 502 to execute or data for processor 502 to operate on. As an example and not by way of limitation, network node 500 may load instructions from storage 506 or another source (such as, for example, another computer system 700) to memory 504. Processor 502 may then load the instructions from memory 504 to an internal register or internal cache.

To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere).

One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. Particular embodiments may include any suitable RAM. Memory 504 may include one or more memories 504, where appropriate. Although this disclosure describes and illustrates particular memory, particular embodiments may include any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to network node 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 506 may take any suitable physical form.

Storage 506 may include one or more storage control units facilitating communication between processor 502 and storage 506, where appropriate. Where appropriate, storage 506 may include one or more storages 506. Although this disclosure describes and illustrates particular storage, particular embodiments may include any suitable storage.

In particular embodiments, I/O interface 508 includes hardware, software, or both, providing one or more interfaces for communication between network node 500 and one or more I/O devices. Network node 500 may include one or more of these I/O devices, where appropriate. One or more of these I/O devices may enable communication between a person and network node 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, particular embodiments may include any suitable I/O interface. In particular embodiments, I/O interface 508 may include an interface to a remote network management system.

In particular embodiments, communication interface 510 includes hardware, software, or both providing one or more interfaces for communication (such as, for example, packet-based communication) between network node 500 and one or more other network nodes 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network.

Particular embodiments may include any suitable network and any suitable communication interface 510 for it. As an example and not by way of limitation, network node 500 may communicate with an ad hoc network, a personal area network (PAN), a LAN, WAN, MAN, or one or more portions of the Internet or a combination of two or more of these. One or more portions of one or more of these networks may be wired or wireless. As an example, network node 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Network node 500 may include any suitable communication interface 510 for any of these networks, where appropriate. Communication interface 510 may include one or more communication interfaces 510, where appropriate. Although this disclosure describes and illustrates a particular communication interface, particular embodiments may include any suitable communication interface.

In particular embodiments, bus 512 includes hardware, software, or both coupling components of network node 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, particular embodiments may include any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

What is claimed is:

1. A network system comprising a first provider edge (PE) router and a second PE router:
   the first PE router comprising:
       a first interface communicably coupled to a first customer edge (CE) router via a first link;
       a second interface communicably coupled to a second CE router via a second link;
       a third interface communicably coupled to the second PE router via a third link;
   the second PE router comprising:
       a first interface communicably coupled to the first CE via a fourth link;
       a second interface communicably coupled to the second CE router via a fifth link;
       a third interface communicably coupled to the first PE router via the third link;
   the first PE router configured with a primary label comprising a primary next hop of the first CE router and a backup next hop of the second PE router and a secondary label comprising a primary next hop of the first CE router and a backup next hop of the second CE router; and
   the second PE router configured with a primary label comprising a primary next hop of the first CE router and a backup next hop of the first PE router and a secondary label comprising a primary next hop of the first CE router and a backup next hop of the second CE router.

2. The network system of claim 1, wherein:
   when the first link and the fourth link are up, ingress traffic at the first PE router with the primary label is forwarded to the first CE router over the first link;
   when the first link is down and the fourth link is up, ingress traffic at the first PE router with the primary label is label switched to the secondary label of the second PE router and is forwarded to the first CE router via the third link to the second PE router and the fourth link to the first CE router; and
   when the first link is down and the fourth link is down, ingress traffic at the first PE router with the primary label is label switched to the secondary label of the second PE router and is forwarded to the second CE router via the third link to the second PE router and the fifth link to the second CE router.

3. The network system of claim 1, wherein the primary label and secondary label configured for the first PE router and the primary label and secondary label configured for the second PE router comprise layer three (L3) virtual private network (VPN) labels.

4. The network system of claim 1, wherein the primary label and secondary label configured for the first PE router and the primary label and secondary label configured for the second PE router comprise labels used for border gateway protocol (BGP) prefix independent convergence (PIC).

5. The network system of claim 1, wherein external border gateway protocol (EBGP) is running between the first and second PE routers and the first and second CE routers and internal border gateway protocol (IBGP) is running between the first and second PE routers; and
   the first PE router primary label primary next hop comprises a preferred EBGP path, the first PE router primary label backup next hop comprises a less preferred IBGP path, the first PE router secondary label primary next hop comprises a preferred EBGP path, and the first PE router secondary label backup next hop comprises a less preferred EBGP path.

6. A first provider edge (PE) router comprising:
   a first interface communicably coupled to a first customer edge (CE) router via a first link;
   a second interface communicably coupled to a second CE router via a second link;
   a third interface communicably coupled to a second PE router via a third link; the second PE router communicably coupled to the first CE router via a fourth link and communicably coupled to the second CE router via a fifth link;
   the first PE router configured with a primary label comprising a primary next hop of the first CE router and a backup next hop of the second PE router and a secondary label comprising a primary next hop of the first CE router and a backup next hop of the second CE router; and
   the second PE router configured with a primary label comprising a primary next hop of the first CE router and a backup next hop of the first PE router and a secondary label comprising a primary next hop of the first CE router and a backup next hop of the second CE router.

7. The first PE router of claim 6, wherein:
   when the first link and the fourth link are up, ingress traffic at the first PE router with the primary label is forwarded to the first CE router over the first link;
   when the first link is down and the fourth link is up, ingress traffic at the first PE router with the primary label is label switched to the secondary label of the second PE router and is forwarded to the first CE router via the third link to the second PE router and the fourth link to the first CE router; and when the first link is down and the fourth link is down, ingress traffic at the first PE router with the primary label is label switched to the secondary label of the second PE router and is forwarded to the second CE router via the third link to the second PE router and the fifth link to the second CE router.

8. The first PE router of claim 6, wherein the primary label and secondary label configured for the first PE router comprise layer three (L3) virtual private network (VPN) labels.

9. The first PE router of claim 6, wherein the primary label and secondary label configured for the first PE router comprise labels used for border gateway protocol (BGP) prefix independent convergence (PIC).

10. The first PE router of claim 6, wherein external border gateway protocol (EBGP) is running between the first and second PE routers and the first and second CE routers and internal border gateway protocol (IBGP) is running between the first and second PE routers; and
the first PE router primary label primary next hop comprises a preferred EBGP path, the first PE router primary label backup next hop comprises a less preferred IBGP path, the first PE router secondary label primary next hop comprises a preferred EBGP path, and the first PE router secondary label backup next hop comprises a less preferred EBGP path.

11. A network system comprising a first provider edge (PE) router and a second PE router:
the first PE router comprising:
a first interface communicably coupled to a first customer edge (CE) router via a first link;
a second interface communicably coupled to a second CE router via a second link;
a third interface communicably coupled to the second PE router via a third link;
the second PE router comprising:
a first interface communicably coupled to the first CE via a fourth link;
a second interface communicably coupled to the second CE router via a fifth link;
a third interface communicably coupled to the first PE router via the third link;
wherein:
external border gateway protocol (EBGP) is running between the first and second PE routers and the first and second CE routers;
internal border gateway protocol (IBGP) is running between the first and second PE routers;
an interior gateway protocol is running between the first and second PE routers and a loopback on each of the first and second CE routers;
the first PE router is configured with a primary label comprising a primary next hop of the first CE router, a first backup next hop of the second PE router, and a second backup next hop of the second CE router; and
the second PE router is configured with a primary label comprising a primary next hop of the first CE router, a first backup next hop of the first PE router, and a second backup next hop of the first CE router.

12. The network system of claim 11, wherein:
when the first link and the fourth link are up, ingress traffic at the first PE router with the primary label is forwarded to the first CE router over the first link;
when the first link is down and the loopback of the first CE router is up according to the interior gateway protocol, ingress traffic at the first PE router with the primary label is sent via the first backup next hop to the second PE router and is forwarded to the first CE router via the third link to the second PE router and the fourth link to the first CE router; and
when the first link is down and the loopback of the first CE router is down according to the interior gateway protocol, ingress traffic at the first PE router with the primary label is sent via the second backup next hop to the second PE router and is forwarded to the second CE router via the third link to the second PE router and the fifth link to the second CE router.

13. The network system of claim 11, wherein the primary label configured for the first PE router and the primary label configured for the second PE router comprise layer three (L3) virtual private network (VPN) labels.

14. The network system of claim 11, wherein the interior gateway protocol comprises one of open shortest path first (OSPF) and intermediate system to intermediate system (ISIS).

15. The network system of claim 11, wherein the first PE router primary next hop comprises a preferred EBGP path, the first PE router first backup next hop comprises a less preferred IBGP path, and the first PE router second backup next hop comprises a less preferred EBGP path.

16. A first provider edge (PE) router comprising:
a first interface communicably coupled to a first customer edge (CE) router via a first link;
a second interface communicably coupled to a second CE router via a second link;
a third interface communicably coupled to a second PE router via a third link; the second PE router communicably coupled to the first CE router via a fourth link and communicably coupled to the second CE router via a fifth link;
wherein:
external border gateway protocol (EBGP) is running between the first and second PE routers and the first and second CE routers;
internal border gateway protocol (IBGP) is running between the first and second PE routers;
an interior gateway protocol is running between the first and second PE routers and a loopback on each of the first and second CE routers;
the first PE router is configured with a primary label comprising a primary next hop of the first CE router, a first backup next hop of the second PE router, and a second backup next hop of the second CE router; and
the second PE router is configured with a primary label comprising a primary next hop of the first CE router, a first backup next hop of the first PE router, and a second backup next hop of the second CE router.

17. The first PE router of claim 16, wherein:
when the first link and the fourth link are up, ingress traffic at the first PE router with the primary label is forwarded to the first CE router over the first link;
when the first link is down and the loopback of the first CE router is up according to the interior gateway protocol, ingress traffic at the first PE router with the primary label is sent via the first backup next hop to the second PE router and is forwarded to the first CE router via the third link to the second PE router and the fourth link to the first CE router; and
when the first link is down and the loopback of the first CE router is down according to the interior gateway protocol, ingress traffic at the first PE router with the primary label is sent via the second backup next hop to the second PE router and is forwarded to the second CE router via the third link to the second PE router and the fifth link to the second CE router.

18. The first PE router of claim 16, wherein the primary label configured for the first PE router and the primary label configured for the second PE router comprise layer three (L3) virtual private network (VPN) labels.

19. The first PE router of claim 16, wherein the interior gateway protocol comprises one of open shortest path first (OSPF) and intermediate system to intermediate system (ISIS).

20. The first PE router of claim 16, wherein the first PE router primary next hop comprises a preferred EBGP path, the first PE router first backup next hop comprises a less preferred IBGP path, and the first PE router second backup next hop comprises a less preferred EBGP path.

* * * * *